United States Patent
Taherzadeh Boroujeni et al.

(10) Patent No.: US 11,424,800 B2
(45) Date of Patent: Aug. 23, 2022

(54) TECHNIQUES FOR SCHEDULING A FRONT-LOADED SIDELINK CHANNEL STATE INFORMATION REFERENCE SIGNAL

(71) Applicant: QUALCOMM Incorporated, San Diego, CA (US)

(72) Inventors: Mahmoud Taherzadeh Boroujeni, San Diego, CA (US); Kapil Gulati, Montgomery, NJ (US); Sony Akkarakaran, Poway, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/948,197

(22) Filed: Sep. 8, 2020

(65) Prior Publication Data

US 2021/0091836 A1 Mar. 25, 2021

Related U.S. Application Data

(60) Provisional application No. 62/903,288, filed on Sep. 20, 2019.

(51) Int. Cl.
*H04B 7/06* (2006.01)
*H04L 5/00* (2006.01)
(Continued)

(52) U.S. Cl.
CPC ......... *H04B 7/0626* (2013.01); *H04L 1/0003* (2013.01); *H04L 5/0051* (2013.01); *H04W 72/02* (2013.01); *H04W 92/18* (2013.01)

(58) Field of Classification Search
CPC ....... H04B 7/0626; H04B 1/00; H04L 1/0003; H04L 5/0051; H04L 12/4013;
(Continued)

(56) References Cited

U.S. PATENT DOCUMENTS

| | | | |
|---|---|---|---|
| 2019/0312618 A1* | 10/2019 | Akkarakaran | H04B 7/0626 |
| 2020/0029340 A1* | 1/2020 | He | H04W 76/14 |
| 2020/0228247 A1* | 7/2020 | Guo | H04L 1/1812 |

FOREIGN PATENT DOCUMENTS

WO    WO-2020092751 A1 *   5/2020   ........... H04L 5/0048

OTHER PUBLICATIONS

CATT: "Power Saving Schemes for UE Adaptation to the BWP/SCell Operation," 3GPP Draft, 3GPP TSG RAN WG1 Meeting #97, R1-1906352, 3rd Generation Partnership Project (3GPP), Mobile Competence Centre, 650, Route Des Lucioles, F-06921, Sophia-Antipolis Cedex, France, vol. RAN WG1. No. Reno. USA, May 13, 2019-May 17, 2019, May 13, 2019 (May 13, 2019), XP051727802, pp. 1-5, Retrieved from the Internet: URL: http://www.3gpp.org/ftp/Meetings%5F3GPP%5FSYNC/RAN1/Docs/R1%2D1906352%2Ezip [retrieved on May 13, 2019] Section 2.1.
(Continued)

*Primary Examiner* — Ian N Moore
*Assistant Examiner* — Latresa A McCallum
(74) *Attorney, Agent, or Firm* — Harrity & Harrity, LLP

(57) ABSTRACT

Various aspects of the present disclosure generally relate to wireless communication. In some aspects, a user equipment (UE) may configure a first set of resources for a physical sidelink shared channel (PSSCH) transmission. The UE may configure a second set of resources for a sidelink channel state information (CSI) reference signal (CSI-RS) transmission, the sidelink CSI-RS transmission is associated with the PSSCH transmission, and the sidelink CSI-RS transmission occurs prior to the PSSCH transmission. The UE may (Continued)

transmit a first sidelink control information (SCI) in a physical sidelink control channel (PSCCH) transmission, the first SCI including an indication of the first set of resources and the second set of resources. Numerous other aspects are provided.

30 Claims, 6 Drawing Sheets

(51) Int. Cl.
*H04L 1/00* (2006.01)
*H04W 72/02* (2009.01)
*H04W 92/18* (2009.01)

(58) Field of Classification Search
CPC .................. H04L 12/40136; H04W 72/02; H04W 92/18; H04W 28/22
See application file for complete search history.

(56) References Cited

OTHER PUBLICATIONS

International Search Report and Written Opinion—PCT/US2020/070516—ISA/EPO—dated Dec. 14, 2020.
LG Electronics: "Discussion on Physical Layer Structure for NR Sidelink," 3GPP Draft, 3GPP TSG RAN WG1 #98, R1-1908900 Discussion on Physical Layer Structure for NR Sidelink, 3rd Generation Partnership Project (3GPP), Mobile Competence Centre, 650, Route Des Lucioles, F-06921, Sophia-Antipolis Cedex, France, vol. RAN WG1. No. Prague. CZ, Aug. 26, 2019-Aug. 30, 2019, Aug. 17, 2019 (Aug. 17, 2019), XP051765508, 34 pages, Retrieved from the Internet: URL: http://www.3gpp.org/ftp/tsg_ran/WG1_RL1/TSGR1_98/Docs/R1-1908900.zip [retrieved on Aug. 17, 2019] Sections 2.1.1.2.1.5.

* cited by examiner

TECHNIQUES FOR SCHEDULING A FRONT-LOADED SIDELINK CHANNEL STATE INFORMATION REFERENCE SIGNAL

CROSS-REFERENCE TO RELATED APPLICATION

This Patent Application claims priority to U.S. Provisional Patent Application No. 62/903,288, filed on Sep. 20, 2019, entitled "TECHNIQUES FOR SCHEDULING A FRONT-LOADED SIDELINK CHANNEL STATE INFORMATION REFERENCE SIGNAL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques for scheduling a front-loaded sidelink channel state information reference signal.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include configuring a first set of resources for a physical sidelink shared channel (PSSCH) transmission; configuring a second set of resources for a sidelink channel state information (CSI) reference signal (CSI-RS) transmission, the sidelink CSI-RS transmission is associated with the PSSCH transmission, and the sidelink CSI-RS transmission occurs prior to the PSSCH transmission; and transmitting a first sidelink control information (SCI) in a physical sidelink control channel (PSCCH) transmission, the first SCI including an indication of the first set of resources and the second set of resources.

In a first aspect, the method includes performing the CSI-RS transmission in the second set of resources and performing the PSCCH transmission in the first set of resources. In a second aspect, alone or in combination with the first aspect, the method includes configuring a third set of resources for a CSI report, associated with the CSI-RS transmission such that the CSI report is received prior to the PSSCH transmission, and transmitting, in the SCI in the PSCCH transmission, an indication of the third set of resources.

In a third aspect, alone or in combination with one or more of the first and second aspects, the method includes performing the CSI-RS transmission in the second set of resources, receiving the CSI report in the third set of resources, configuring one or more transmission parameters for the PSCCH transmission based at least in part on the CSI report, and performing the PSCCH transmission based at least in part on the one or more transmission parameters. In a fourth aspect, alone or in combination with one or more of the first through third aspects, the one or more transmission parameters comprise at least one of an MCS, a TBS, a number of MIMO layers, and/or the like.

In a fifth aspect, alone or in combination with one or more of the first through fourth aspects, the PSSCH transmission includes a second SCI indicating one or more transmission parameters. In a sixth aspect, alone or in combination with one or more of the first through fifth aspects, the first SCI indicates that the PSSCH transmission includes the second SCI. In a seventh aspect, alone or in combination with one or more of the first through sixth aspects, the first SCI indicates a location in the PSSCH transmission of the second SCI. In an eighth aspect, alone or in combination with one or more of the first through seventh aspects, the second set of resources being scheduled for the CSI-RS transmission implicitly indicates that the PSSCH transmission includes the second SCI.

In some aspects, a UE for wireless communication may include memory and one or more processors coupled to the memory. The memory and the one or more processors may be configured to configure a first set of resources for a PSSCH transmission; configure a second set of resources for a sidelink CSI-RS transmission, the sidelink CSI-RS transmission is associated with the PSSCH transmission, and the sidelink CSI-RS transmission occurs prior to the PSSCH transmission; and transmit a first SCI in a PSCCH transmission, the first SCI including an indication of the first set of resources and the second set of resources.

In a first aspect, the one or more processors are further configured to perform the CSI-RS transmission in the second set of resources and perform the PSCCH transmission in the first set of resources. In a second aspect, alone or in combination with the first aspect, the one or more processors are further configured to configure a third set of resources for a CSI report, associated with the CSI-RS transmission such that the CSI report is received prior to the PSSCH transmission and transmit, in the SCI in the PSCCH transmission, an indication of the third set of resources.

In a third aspect, alone or in combination with one or more of the first and second aspects, the one or more processors are further configured to perform the CSI-RS transmission in the second set of resources, receive the CSI report in the third set of resources, configure one or more transmission parameters for the PSCCH transmission based at least in part on the CSI report, and perform the PSCCH transmission based at least in part on the one or more transmission parameters. In a fourth aspect, alone or in combination with one or more of the first through third aspects, the one or more transmission parameters comprise at least one of an MCS, a TBS, a number of MIMO layers, and/or the like.

In a fifth aspect, alone or in combination with one or more of the first through fourth aspects, the PSSCH transmission includes a second SCI indicating one or more transmission parameters. In a sixth aspect, alone or in combination with one or more of the first through fifth aspects, the first SCI indicates that the PSSCH transmission includes the second SCI. In a seventh aspect, alone or in combination with one or more of the first through sixth aspects, the first SCI indicates a location in the PSSCH transmission of the second SCI. In an eighth aspect, alone or in combination with one or more of the first through seventh aspects, the second set of resources being scheduled for the CSI-RS transmission implicitly indicates that the PSSCH transmission includes the second SCI.

In some aspects, a non-transitory computer-readable medium may store one or more instructions for wireless communication. The one or more instructions, when executed by one or more processors of a UE, may cause the one or more processors to: configure a first set of resources for a PSSCH transmission; configure a second set of resources for a sidelink CSI-RS transmission, the sidelink CSI-RS transmission is associated with the PSSCH transmission, and the sidelink CSI-RS transmission occurs prior to the PSSCH transmission; and transmit a first SCI in a PSCCH transmission, the first SCI including an indication of the first set of resources and the second set of resources.

In a first aspect, the one or more instructions, when executed by the one or more processors, further cause the one or more processors to perform the CSI-RS transmission in the second set of resources and perform the PSCCH transmission in the first set of resources. In a second aspect, alone or in combination with the first aspect, the one or more instructions, when executed by the one or more processors, further cause the one or more processors to configure a third set of resources for a CSI report, associated with the CSI-RS transmission such that the CSI report is received prior to the PSSCH transmission, and transmit, in the SCI in the PSCCH transmission, an indication of the third set of resources.

In a third aspect, alone or in combination with one or more of the first and second aspects, the one or more instructions, when executed by the one or more processors, further cause the one or more processors to perform the CSI-RS transmission in the second set of resources, receive the CSI report in the third set of resources, configure one or more transmission parameters for the PSCCH transmission based at least in part on the CSI report, and perform the PSCCH transmission based at least in part on the one or more transmission parameters. In a fourth aspect, alone or in combination with one or more of the first through third aspects, the one or more transmission parameters comprise at least one of an MCS, a TBS, a number of MIMO layers, and/or the like.

In a fifth aspect, alone or in combination with one or more of the first through fourth aspects, the PSSCH transmission includes a second SCI indicating one or more transmission parameters. In a sixth aspect, alone or in combination with one or more of the first through fifth aspects, the first SCI indicates that the PSSCH transmission includes the second SCI. In a seventh aspect, alone or in combination with one or more of the first through sixth aspects, the first SCI indicates a location in the PSSCH transmission of the second SCI. In an eighth aspect, alone or in combination with one or more of the first through seventh aspects, the second set of resources being scheduled for the CSI-RS transmission implicitly indicates that the PSSCH transmission includes the second SCI.

In some aspects, an apparatus for wireless communication may include means for configuring a first set of resources for a PSSCH transmission; means for configuring a second set of resources for a sidelink CSI-RS transmission, the sidelink CSI-RS transmission is associated with the PSSCH transmission, and the sidelink CSI-RS transmission occurs prior to the PSSCH transmission; and means for transmitting a first SCI in a PSCCH transmission, the first SCI including an indication of the first set of resources and the second set of resources.

In a first aspect, the apparatus includes means for performing the CSI-RS transmission in the second set of resources and means for performing the PSCCH transmission in the first set of resources. In a second aspect, alone or in combination with the first aspect, the apparatus includes means for configuring a third set of resources for a CSI report, associated with the CSI-RS transmission such that the CSI report is received prior to the PSSCH transmission, and means for transmitting, in the SCI in the PSCCH transmission, an indication of the third set of resources.

In a third aspect, alone or in combination with one or more of the first and second aspects, the apparatus includes means for performing the CSI-RS transmission in the second set of resources, means for receiving the CSI report in the third set of resources, means for configuring one or more transmission parameters for the PSCCH transmission based at least in part on the CSI report, and means for performing the PSCCH transmission based at least in part on the one or more transmission parameters. In a fourth aspect, alone or in combination with one or more of the first through third aspects, the one or more transmission parameters comprise at least one of an MCS, a TBS, a number of MIMO layers, and/or the like.

In a fifth aspect, alone or in combination with one or more of the first through fourth aspects, the PSSCH transmission includes a second SCI indicating one or more transmission parameters. In a sixth aspect, alone or in combination with one or more of the first through fifth aspects, the first SCI indicates that the PSSCH transmission includes the second SCI. In a seventh aspect, alone or in combination with one or more of the first through sixth aspects, the first SCI indicates a location in the PSSCH transmission of the second SCI. In an eighth aspect, alone or in combination with one or more of the first through seventh aspects, the second set of resources being scheduled for the CSI-RS transmission implicitly indicates that the PSSCH transmission includes the second SCI.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
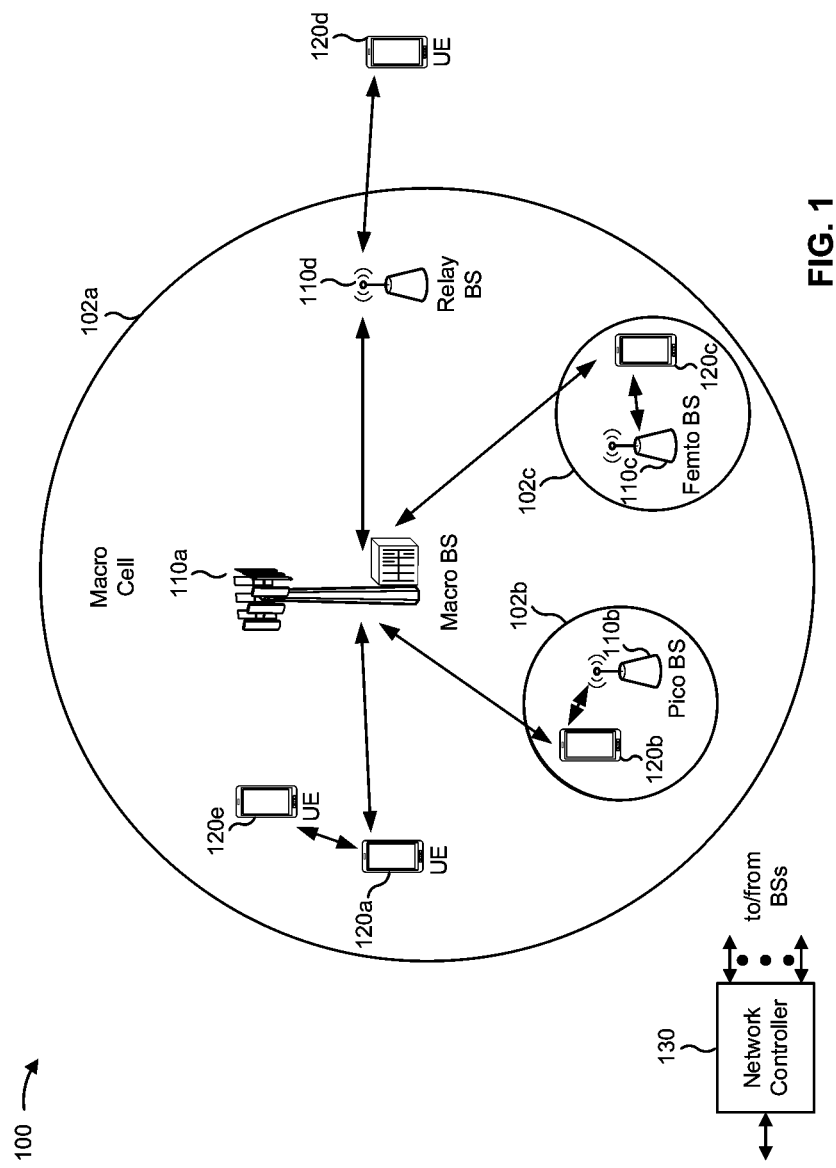
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
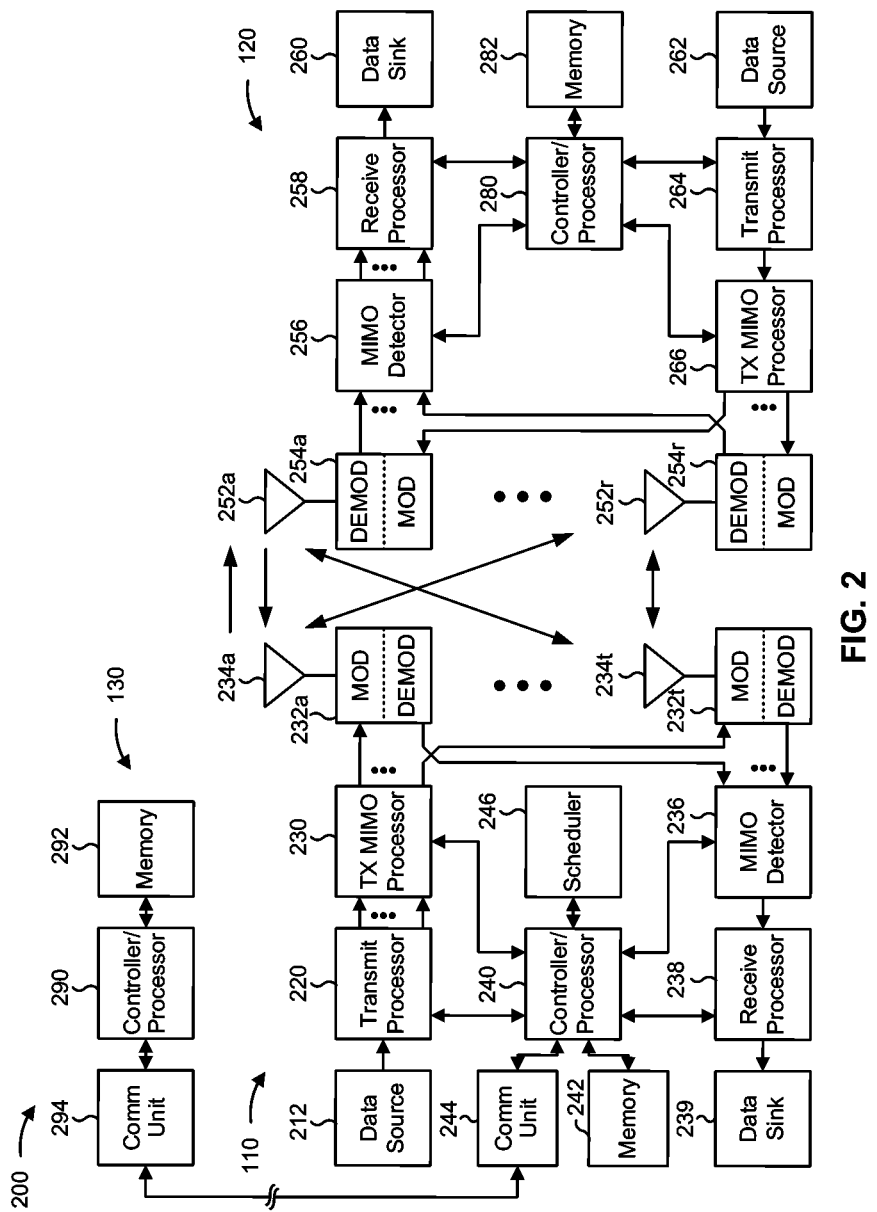
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with scheduling a front-loaded sidelink channel state information (CSI) reference signal (CSI-RS), as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for configuring a first set of resources for a physical sidelink shared channel (PSSCH) transmission, means for configuring a second set of resources for a sidelink CSI-RS transmission, the sidelink CSI-RS transmission is associated with the PSSCH transmission, and the sidelink CSI-RS transmission occurs prior to the PSSCH transmission, means for transmitting a first sidelink control information (SCI) in a physical sidelink control channel (PSCCH) transmission, the first SCI including an indication of the first set of resources and the second set of resources, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

As indicated above, in some cases, two or more UEs may communicate directly via a sidelink. For example, a first UE may transmit one or more sidelink communications to a second UE on the sidelink and/or may receive one or more sidelink communications from the second UE on the sidelink. A UE may be configured with one or more sets of resources, where each set of resources may include one or more time-domain resources (e.g., one or more slots, one or more symbols, and/or the like) and/or one or more frequency-domain resources (e.g., one or more frequency carriers, one or more subcarriers, and/or the like) that the UE may use to transmit sidelink communications.

In some cases, a UE may perform a first sidelink transmission in a first set of resources, and may subsequently perform a second sidelink transmission in a second set of resources that includes different frequency-domain resources relative to the first set of resources. In this case, the UE may switch frequency carriers or subcarriers from the first sidelink transmission to the second sidelink transmission. If the UE does not have CSI feedback associated with the second set of resources, the UE may be unable to configure transmission parameters for the second sidelink transmission based at least in part on sidelink channel conditions on the frequency-domain resources included in the second set of resources.

Some aspects describe herein provide techniques for scheduling a front-loaded sidelink CSI-RS. In some aspects, a UE may configure a first set of resources for a PSSCH transmission and a second set of resources for a sidelink CSI-RS transmission. In some aspects, the UE may configure the second set of resources such that the sidelink CSI-RS transmission is a front-loaded sidelink CSI-RS (e.g., a sidelink CSI-RS transmission that occurs prior to the PSSCH transmission) associated with the PSSCH transmission in that the UE may configure one or more transmission parameters for the PSSCH transmission based at least in part on CSI feedback that is determined based at least in part on the CSI-RS transmission. The UE may transmit a PSCCH transmission to another UE. The PSCCH transmission may include SCI that identifies the first set of resources and the second set of resources.

Accordingly, the UE may perform the sidelink CSI-RS transmission in the second set of resources. The other UE may perform one or more measurements of the sidelink CSI-RS and may provide CSI feedback to the UE based at least in part on results of the one or more measurements. The UE may receive the CSI feedback and may configure one or more transmission parameters for the PSSCH transmission based at least in part on the CSI feedback. The UE may perform the PSSCH transmission based at least in part on the one or more transmission parameters. In some aspects, the UE may configure the PSSCH transmission to include SCI that identifies the one or more transmission parameters.

In this way, if the UE switches frequency-domain resources between a first PSSCH transmission and a second PSSCH transmission, the UE may transmit a front-loaded CSI-RS to receive CSI feedback and to configure transmission parameters for the second PSSCH transmission, which increases the efficiently of the second PSSCH transmission, increases the reliability of the second PSSCH transmission, increases the signal quality of the second PSSCH transmission, and/or the like.

Figure 3A:
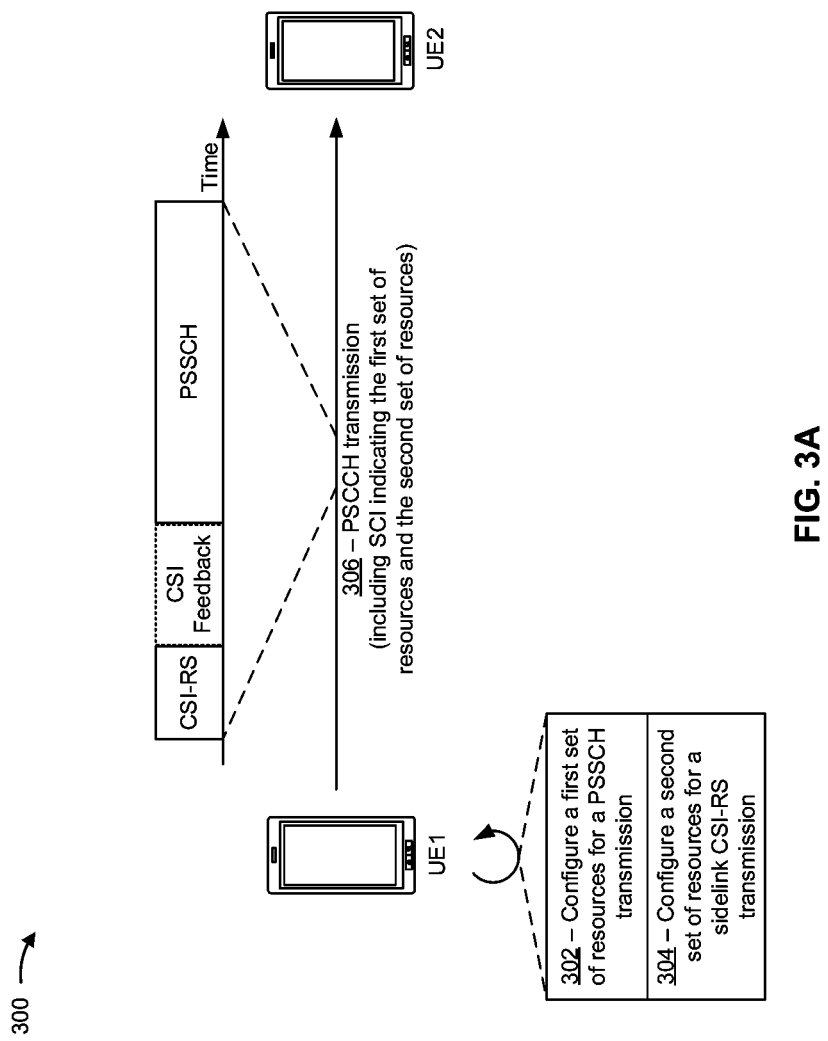
FIGS. 3A and 3B are diagrams illustrating one or more examples of scheduling a front-loaded sidelink channel state information reference signal, in accordance with various aspects of the present disclosure.
Figure 3B:
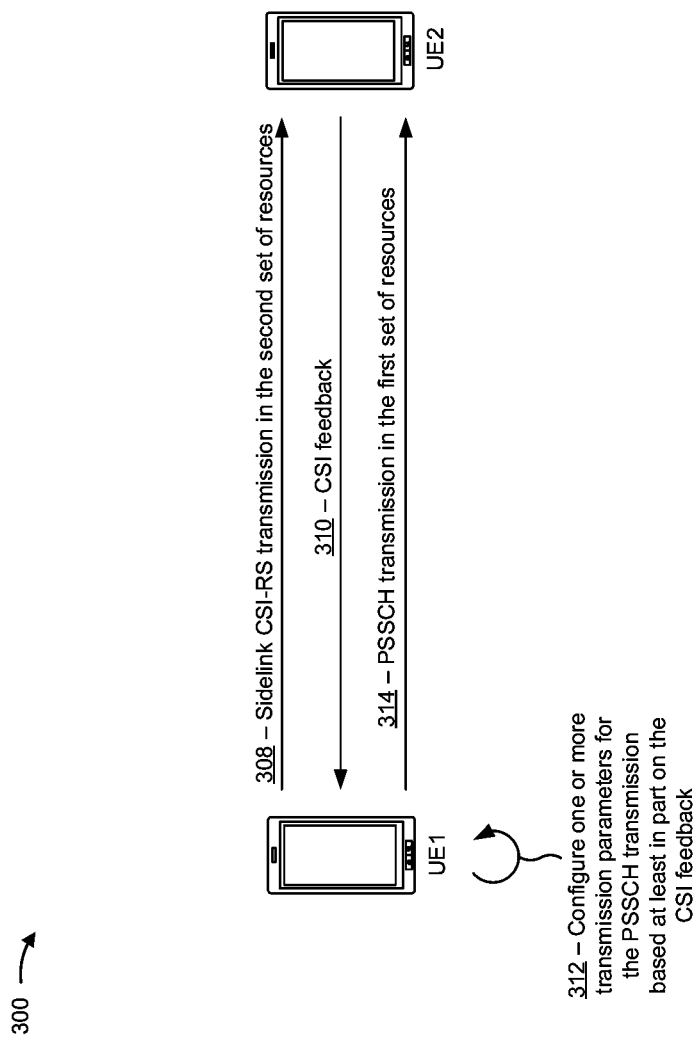

FIGS. 3A and 3B are diagrams illustrating one or more examples 300 of scheduling a front-loaded sidelink CSI-RS, in accordance with various aspects of the present disclosure. As shown in FIGS. 3A and 3B, example(s) 300 may include sidelink communication between a plurality of UEs (e.g., UEs 120), such as UE1, UE2, and/or the like.

As shown in FIG. 3A, and by reference number 302, UE1 may configure a first set of resources for a PSSCH transmission to UE2. In some aspects, UE1 may be scheduled by a BS (e.g., BS 110) or another UE (e.g., UE2 and/or another UE) to perform the PSSCH transmission. In some aspects, UE1 may determine to perform the PSSCH transmission (e.g., based at least in part on determining that UE1 has data to transmit to UE2 and/or the like).

In some aspects, the first set of resources may be a set of resources identified from a plurality of sets of resources configured for UE1 for performing sidelink transmissions. In some aspects, the plurality of sets of resources may be configured for UE1 by a BS (e.g., a serving BS and/or another BS). The first set of resources may include one or more time-domain resources and/or one or more frequency domain resources in which UE1 is to perform the PSSCH transmission. In some aspects, UE1 may identify the first set of resources from the plurality of sets of resources based at least in part on determining that the frequency carriers or subcarriers in the first set of resources are available and/or are not being used for other sidelink transmissions, are not being used for reception of sidelink transmission, and/or the like.

As further shown in FIG. 3A, and by reference number 304, UE1 may configure a second set of resources for a sidelink CSI-RS transmission to UE2. In some aspects, UE1 may configure the second set of resources based at least in part on determining to perform the sidelink CSI-RS transmission. UE1 may determine to perform the sidelink CSI-RS transmission based at least in part on determining that the PSSCH transmission is to occur in different frequency-domain resources from a previous PSSCH transmission performed by UE1. In this case, the sidelink CSI-RS transmission may be associated with the PSSCH transmission in that UE1 may use CSI feedback, that is generated based at least in part on the sidelink CSI-RS transmission, to configure one or more transmission parameters for the PSSCH transmission.

In some aspects, the second set of resources may be a set of resources identified from the plurality of sets of resources configured for UE1 for performing sidelink transmissions. The second set of resources may include one or more time-domain resources and/or one or more frequency domain resources in which UE1 is to perform the sidelink CSI-RS transmission. In some aspects, UE1 may identify the second set of resources from the plurality of sets of resources based at least in part on determining that the second set of resources includes the same frequency-domain resources as the first set of resources and includes different time-domain resources than the first set of resources.

In some aspects, UE1 may select the second set of resources such that the second set of resources includes the same frequency-domain resources as the first set of resources, and such that UE2 provides CSI feedback for the frequency-domain resources in which UE1 will perform the PSSCH transmission. In this way, the CSI feedback may provide an accurate indication of channel conditions on the PSSCH in the frequency-domain resources in which UE1 will perform the PSSCH transmission.

In some aspects, UE1 may select the second set of resources such that the second set of resources includes time-domain resources that occur prior to the time-domain resources included in the first set of resources. In this way, UE1 may perform the sidelink CSI-RS transmission prior to performing the PSSCH transmission, so that UE1 may receive CSI feedback and configure the one or more transmission parameters for the PSSCH transmission prior to performing the PSSCH transmission. In some aspects, UE1 may select the second set of resources such that the time-domain resources included in the second set of resources occur at least a threshold amount of time prior to the time-domain resources included in the first set of resources. The threshold amount of time allows for a CSI feedback time window in which UE2 may generate and provide the CSI feedback to UE1, and UE1 may configure the one or more transmission parameters prior to performing the PSSCH transmission.

In some aspects, UE1 may configure a third set of resources, between the first set of resources and the second set of resources in the time domain (e.g., in the CSI feedback time window), for UE2 to transmit the CSI feedback to UE1. In some aspects, UE2 or a B S may configure the third set of resources.

As further shown in FIG. 3A, and by reference number 306, UE1 may transmit a PSCCH transmission to UE2. The PSCCH transmission may include SCI that indicates the first set of resources and the second set of resources to UE2). In some aspects, the SCI may indicate the third set of resources UE2. Moreover, the SCI may indicate that UE1 is to perform the PSSCH transmission in the first set of resources, that UE1 is to perform the sidelink CSI-RS transmission in the second set of resources, that the sidelink CSI-RS transmission is associated with the PSSCH transmission, that UE2 is to provide CSI feedback to UE1 based at least in part on the sidelink CSI-RS transmission, and/or the like.

In some aspects, UE2 may receive the PSCCH transmission and may identify the SCI included in the PSCCH transmission. Accordingly, UE2 may monitor for the sidelink CSI-RS transmission in the first set of resources identified in the SCI, may monitor for the PSSCH transmission in the second set of resources, may provide CSI feedback in the third set of resources, and/or the like.

As shown in FIG. 3B, and by reference number 308, UE1 may perform the sidelink CSI-RS transmission in the second set of resources. For example, UE1 may perform the sidelink CSI-RS transmission on the sidelink between UE1 and UE2 (e.g., on a PSSCH, on a PSCCH, and/or the like) in the time-domain resources and/or the frequency-domain resources included in the second set of resources. In some aspects, UE1 may perform the sidelink CSI-RS transmission after transmitting the PSCCH transmission to UE2.

As further shown in FIG. 3B, and by reference number 310, UE2 may transmit CSI feedback to UE1. The CSI feedback may be based at least in part on the sidelink CSI-RS transmission. For example, UE2 may receive the sidelink CSI-RS transmission from UE1, may perform one or more measurements of the sidelink CSI-RS transmission, and may generate the CSI feedback based at least in part on the results of the one or more measurements.

In some aspects, the one or more measurements may include one or more RSRP measurements, one or more RSSI measurements, one or more RSRQ measurements, one or more CQI measurements, one or more pathloss measurements, and/or other types of signal measurements. In some aspects, the CSI feedback may include a channel quality indicator (CQI), a rank indicator (RI), a precoding matrix indicator (PMI), a CSI-RS resource indicator (CRI), a strongest layer indication (SLI), a layer one RSRP (L1-RSRP) for beam management, and/or other types of channel state indicators.

As further shown in FIG. 3B, and by reference number 312, UE1 may configure the one or more transmission parameters for the PSSCH transmission based at least in part on the CSI feedback. The one or more transmission parameters may include a modulation coding scheme (MCS) for the PSSCH transmission, a transport block size (TBS) for the PSSCH transmission, a number of MIMO layers on which the PSCCH transmission is to be performed, and/or other channel processing parameters.

As further shown in FIG. 3B, and by reference number 314, UE1 may perform the PSSCH transmission in the first set of resources. For example, UE1 may perform the PSSCH transmission on the sidelink between UE1 and UE2 in the time-domain resources and/or the frequency-domain resources included in the first set of resources. In this case, UE1 may perform the PSSCH transmission after performing the sidelink CSI-RS transmission.

In some aspects, UE1 may configure the PSSCH transmission to include SCI that identifies the one or more transmission parameters configured for the PSSCH transmission. In this way, UE2 may identify the SCI included in the PSSCH transmission, may identify the one or more transmission parameters indicated in the SCI, and may perform demodulation, decoding, and/or other channel processing techniques based at least in part on the one or more transmission parameters.

In some aspects, UE1 may configure a subset of the time-domain resources and/or the frequency-domain resources included in the first set of resources to carry the SCI included in the PSSCH transmission. In some aspects, UE1 may configure the SCI included in the PSCCH transmission such that the SCI included in the PSCCH transmission indicates whether the PSSCH transmission includes the SCI indicating the one or more transmission parameters. In this case, UE2 may receive the PSCCH transmission, may determine that the SCI included in the PSCCH transmission indicates that the PSSCH transmission includes the SCI indicating the one or more transmission parameters, and may identify the SCI indicating the one or more transmission parameters in the PSSCH transmission based at least in part on the SCI included in the PSCCH transmission.

In some aspects, UE1 may configure the SCI included in the PSCCH transmission such that the SCI included in the PSCCH transmission identifies a location of the SCI (e.g., the time-domain resources and/or the frequency-domain resources carrying the SCI), indicating the one or more transmission parameters, in the PSSCH transmission. In this case, UE2 may receive the PSCCH transmission and may identify the location of the SCI included in the PSSCH transmission based at least in part on the SCI included in the PSCCH transmission.

In some aspects, UE1 may implicitly indicate whether the PSSCH transmission includes the SCI indicating the one or more transmission parameters, may implicitly indicate the location of the SCI in the PSSCH transmission, and/or the like. For example, the second set of resources may be a set of resources associated with the PSSCH transmission including the SCI indicating the one or more transmission parameters and/or may be associated with the location of the SCI in the PSSCH transmission. In this case, the second set of resources being scheduled for the CSI-RS transmission implicitly indicates that the PSSCH transmission includes the SCI indicating the one or more transmission parameters and/or implicitly indicates the location of the SCI in the PSSCH transmission.

In this way, UE1 may configure a first set of resources for a PSSCH transmission and a second set of resources for a sidelink CSI-RS transmission. UE1 may configure the second set of resources such that the sidelink CSI-RS transmission is a front-loaded sidelink CSI-RS associated with the PSSCH transmission, in that UE1 may configure one or more transmission parameters for the PSSCH transmission based at least in part on CSI feedback that is determined based at least in part on the CSI-RS transmission. UE1 may transmit a PSCCH transmission to UE2. The PSCCH transmission may include SCI that indicates the first set of resources and the second set of resources.

UE1 may perform the sidelink CSI-RS transmission in the second set of resources. UE2 may perform one or more measurements of the sidelink CSI-RS and may provide CSI feedback to UE1 based at least in part on results of the one or more measurements. UE1 may receive the CSI feedback and may configure one or more transmission parameters for the PSSCH transmission based at least in part on the CSI feedback. UE1 may perform the PSSCH transmission based at least in part on the one or more transmission parameters. UE1 may configure the PSSCH transmission to include SCI that identifies the one or more transmission parameters.

In this way, if UE1 switches frequency-domain resources between a first PSSCH transmission and a second PSSCH transmission, UE1 may transmit a front-loaded CSI-RS to receive CSI feedback and to configure transmission parameters for the second PSSCH transmission, which increases the efficiency of the second PSSCH transmission, increases the reliability of the second PSSCH transmission, increases the signal quality of the second PSSCH transmission, and/or the like.

As indicated above, FIGS. 3A and 3B are provided as one or more examples. Other examples may differ from what is described with respect to FIGS. 3A and 3B.

Figure 4:
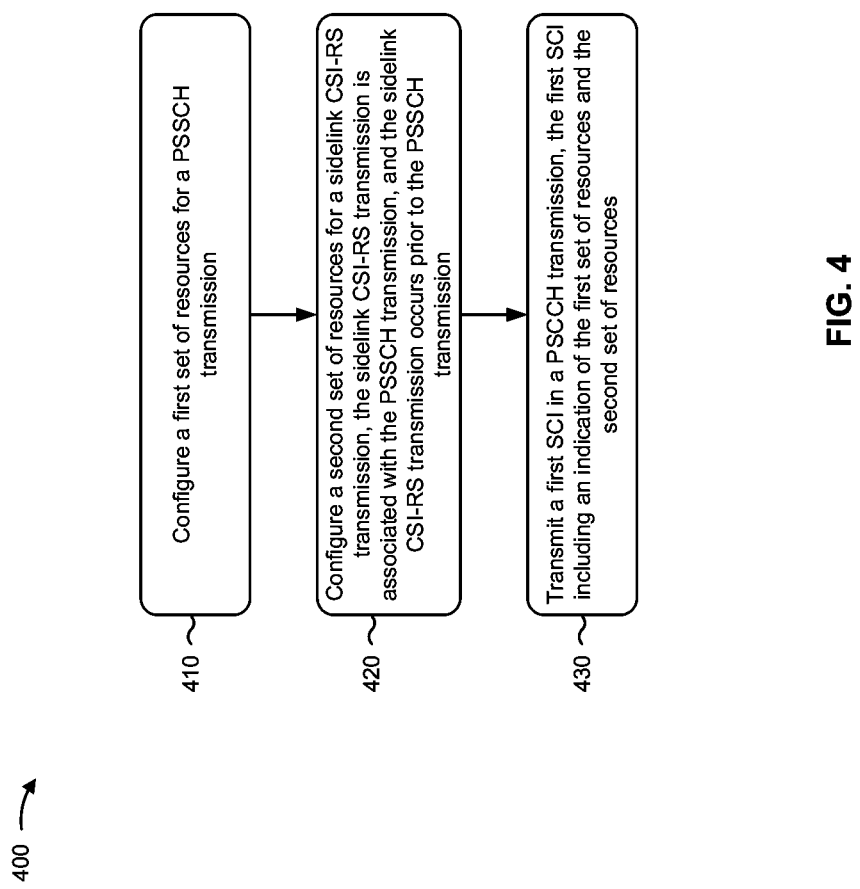
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120) performs operations associated with scheduling a front-loaded sidelink CSI-RS.

As shown in FIG. 4, in some aspects, process 400 may include configuring a first set of resources for a PSSCH transmission (block 410). For example, the UE (e.g., using receive processor 258, transmit processor 264, controller/processor 280, memory 282, resource configuration component 506 of FIG. 5, and/or the like) may configure a first set of resources for a PSSCH transmission, as described above.

As further shown in FIG. 4, in some aspects, process 400 may include configuring a second set of resources for a sidelink CSI-RS transmission, the sidelink CSI-RS transmission is associated with the PSSCH transmission, and the sidelink CSI-RS transmission occurs prior to the PSSCH transmission (block 420). For example, the UE (e.g., using receive processor 258, transmit processor 264, controller/processor 280, memory 282, resource configuration component 506, and/or the like) may configure a second set of resources for a sidelink CSI-RS transmission, the sidelink CSI-RS transmission is associated with the PSSCH transmission, and the sidelink CSI-RS transmission occurs prior to the PSSCH transmission, as described above.

As further shown in FIG. 4, in some aspects, process 400 may include transmitting a first SCI in a PSCCH transmission, the first SCI including an indication of the first set of resources and the second set of resources (block 430). For example, the UE (e.g., using antenna 252, MOD 254, transmit processor 264, Tx MIMO processor 266, controller/processor 280, memory 282, transmission component 510 of FIG. 5, and/or the like) may transmit a first SCI in a PSCCH transmission, the first SCI including an indication of the first set of resources and the second set of resources, as described above.

Process 400 may include additional aspects, such as any single aspect or any combination of aspects described below and/or in connection with one or more other processes described elsewhere herein.

In a first aspect, process 400 includes performing (e.g., using antenna 252, MOD 254, transmit processor 264, Tx MIMO processor 266, controller/processor 280, memory 282, transmission component 510, and/or the like) the CSI-RS transmission in the second set of resources and performing (e.g., using antenna 252, MOD 254, transmit processor 264, Tx MIMO processor 266, controller/processor 280, memory 282, transmission component 510, and/or the like) the PSCCH transmission in the first set of resources. In a second aspect, alone or in combination with the first aspect, process 400 includes configuring (e.g., using receive processor 258, transmit processor 264, controller/processor 280, memory 282, resource configuration component 506, and/or the like) a third set of resources for a CSI report, associated with the CSI-RS transmission such that the CSI report is received prior to the PSSCH transmission and transmitting (e.g., using antenna 252, MOD 254, transmit processor 264, Tx MIMO processor 266, controller/processor 280, memory 282, transmission component 510, and/or the like), in the SCI in the PSCCH transmission, an indication of the third set of resources.

Figure 5:
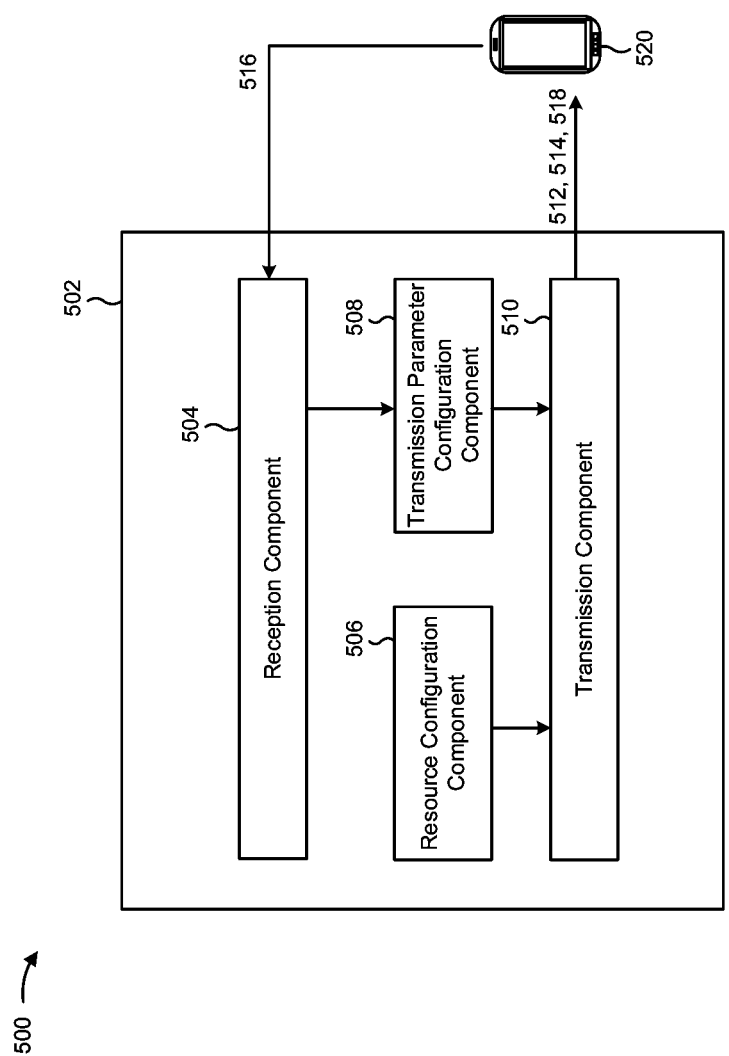
FIG. 5 is a conceptual data flow diagram illustrating the data flow between different modules/means/components in an example apparatus, in accordance with various aspects of the present disclosure.

In a third aspect, alone or in combination with one or more of the first and second aspects, process 400 includes performing (e.g., using antenna 252, MOD 254, transmit processor 264, Tx MIMO processor 266, controller/processor 280, memory 282, transmission component 510, and/or the like) the CSI-RS transmission in the second set of resources, receiving (e.g., using antenna 252, DEMOD 254, MIMO detector 256, receive processor 258, controller/processor 280, memory 282, reception component 504 of FIG. 5, and/or the like) the CSI report in the third set of resources, configuring (e.g., using receive processor 258, transmit processor 264, controller/processor 280, memory 282, transmission parameter configuration component 508 of FIG. 5, and/or the like) one or more transmission parameters for the PSCCH transmission based at least in part on the CSI report, and performing (e.g., using antenna 252, MOD 254, transmit processor 264, Tx MIMO processor 266, controller/processor 280, memory 282, transmission component 510, and/or the like) the PSCCH transmission based at least in part on the one or more transmission parameters. In a fourth aspect, alone or in combination with one or more of the first through third aspects, the one or more transmission parameters comprise at least one of an MCS, a TBS, a number of MIMO layers, and/or the like.

In a fifth aspect, alone or in combination with one or more of the first through fourth aspects, the PSSCH transmission includes a second SCI indicating one or more transmission parameters. In a sixth aspect, alone or in combination with one or more of the first through fifth aspects, the first SCI indicates that the PSSCH transmission includes the second SCI. In a seventh aspect, alone or in combination with one or more of the first through sixth aspects, the first SCI indicates a location in the PSSCH transmission of the second SCI. In an eighth aspect, alone or in combination with one or more of the first through seventh aspects, the second set of resources being scheduled for the CSI-RS transmission implicitly indicates that the PSSCH transmission includes the second SCI.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a conceptual data flow diagram 500 illustrating the data flow between different modules/means/components in an example apparatus 502. The apparatus 502 may be a UE (e.g., UE 120). In some aspects, the apparatus 502 includes a reception component 504, a resource configuration component 506, a transmission parameter configuration component 508, a transmission component 510, and/or the like.

In some aspects, resource configuration component 506 may configure various sets of resources for sidelink transmissions to UE 520 (e.g., UE 120) and/or for receiving sidelink transmissions from UE 520. For example, resource configuration component 506 may configure a first set of resources for performing a PSSCH transmission 518. As another example, resource configuration component 506 may configure a second set of resources for performing a sidelink CSI-RS transmission 514. As another example, resource configuration component 506 may configure a third set of resources for receiving CSI feedback 516 from UE 520. In some aspects, resource configuration component 506 may configure the first set of resources and the second set of resources such that sidelink CSI-RS transmission 514 occurs prior to PSSCH transmission 518. In some aspects, resource configuration component 506 may configure the first set of resources and the second set of resources such that sidelink CSI-RS transmission 514 occurs prior to PSSCH transmission 518.

In some aspects, resource configuration component 506 may configure the first set of resources, the second set of resources, and the third set of resources such that sidelink CSI-RS transmission 514 occurs prior to reception of CSI feedback 516 and prior to PSSCH transmission 518, and such that reception of CSI feedback 516 occurs prior to PSSCH transmission 518. In some aspects, resource configuration component 506 may include a receive processor (e.g., receive processor 258), a transmit processor (e.g., transmit processor 264), a controller/processor (e.g., controller/processor 280), a memory (e.g., memory 282), and/or the like.

In some aspects, transmission component 510 may transmit a PSCCH transmission 512 to UE 520. PSCCH transmission 512 may include SCI that indicates the first set of resources, the second set of resources, and/or the third set of resources. In some aspects, transmission component 510 may perform sidelink CSI-RS transmission 514 after PSCCH transmission 512. For example, transmission component 510 may perform sidelink CSI-RS transmission 514 in the second set of resources configured by resource configuration component 506. In some aspects, transmission component 510 may include an antenna (e.g., antenna 252), a MOD (e.g., MOD 254), a Tx MIMO processor (e.g., TX MIMO processor 266), a transmit processor (e.g., transmit processor 264), a controller/processor (e.g., controller/processor 280), a memory (e.g., memory 282), and/or the like.

In some aspects, reception component 504 may receive CSI feedback 516 from UE 520. In some aspects, UE 520 may generate CSI feedback 516 based at least in part on sidelink CSI-RS transmission 514. In some aspects, reception component 504 may provide CSI feedback 516 to transmission parameter configuration component 508. In some aspects, reception component 504 may include an antenna (e.g., antenna 252), a DEMOD (e.g., DEMOD 254), a MIMO detector (e.g., MIMO detector 256), a controller/processor (e.g., controller/processor 280), a memory (e.g., memory 282), and/or the like.

In some aspects, transmission parameter configuration component 508 may configure one or more transmission parameters for PSSCH transmission 518. In some aspects, transmission parameter configuration component 508 may configure the one or more transmission parameters based at least in part on CSI feedback 516. In some aspects, transmission parameter configuration component 508 may provide the one or more transmission parameters to transmission component 510. In some aspects, transmission parameter configuration component 508 may include a receive processor (e.g., receive processor 258), a transmit processor (e.g., transmit processor 264), a controller/processor (e.g., controller/processor 280), a memory (e.g., memory 282), and/or the like.

In some aspects, transmission component 510 may perform PSSCH transmission 518. For example, transmission component 510 may perform PSSCH transmission 518 based at least in part on the one or more transmission parameters configured by transmission parameter configuration component 508. In some aspects, transmission component 510 may include SCI in PSSCH transmission 518. The SCI in PSSCH transmission 518 may indicate the one or more transmission parameters to UE 520.

The apparatus 502 may include additional components that perform each of the blocks of the algorithm in the aforementioned process 400 of FIG. 4 and/or the like. Each block in the aforementioned process 400 of FIG. 4 and/or the like may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   configuring a first set of resources for a physical sidelink shared channel (PSSCH) transmission;
   configuring a second set of resources for a sidelink channel state information (CSI) reference signal (CSI-RS) transmission, wherein the sidelink CSI-RS transmission is associated with the PSSCH transmission, and the sidelink CSI-RS transmission occurs prior to the PSSCH transmission;

transmitting a first sidelink control information (SCI) in a physical sidelink control channel (PSCCH) transmission, the first SCI including an indication of the first set of resources and the second set of resources;

performing the sidelink CSI-RS transmission in the second set of resources;

receiving a CSI report in a third set of resources;

configuring one or more transmission parameters for the PSSCH transmission based at least in part on the CSI report and performing the PSSCH transmission based at least in part on the one or more transmission parameters.

2. The method of claim 1, wherein performing the PSSCH transmission comprises:

performing the PSSCH transmission in the first set of resources.

3. The method of claim 1, further comprising:

configuring the third set of resources for the CSI report such that the CSI report is received prior to the PSSCH transmission, wherein the first SCI further includes an indication of the third set of resources.

4. The method of claim 1, wherein the one or more transmission parameters comprise at least one of:

a modulation coding scheme, a transport block size, or a number of multiple-input multiple-output layers.

5. The method of claim 1, wherein the PSSCH transmission includes a second SCI.

6. The method of claim 5, wherein the first SCI indicates that the PSSCH transmission includes the second SCI.

7. The method of claim 5, wherein the first SCI indicates a location in the PSSCH transmission of the second SCI.

8. The method of claim 5, wherein the second set of resources being scheduled for the sidelink CSI-RS transmission implicitly indicates that the PSSCH transmission includes the second SCI.

9. A user equipment (UE) for wireless communication, comprising:

a memory; and one or more processors coupled to the memory, the one or more processors configured to:

configure a first set of resources for a physical sidelink shared channel (PSSCH) transmission;

configure a second set of resources for a sidelink channel state information (CSI) reference signal (CSI-RS) transmission, wherein the sidelink CSI-RS transmission is associated with the PSSCH transmission, and the sidelink CSI-RS transmission occurs prior to the PSSCH transmission;

transmit a first sidelink control information (SCI) in a physical sidelink control channel (PSCCH) transmission, the first SCI including an indication of the first set of resources and the second set of resources;

perform the sidelink CSI-RS transmission in the second set of resources;

receive a CSI report in a third set of resources;

configure one or more transmission parameters for the PSSCH transmission based at least in part on the CSI report and perform the PSSCH transmission based at least in part on the one or more transmission parameters.

10. The UE of claim 9, wherein, when performing the PSSCH transmission, the one or more processors are configured to:

perform the PSSCH transmission in the first set of resources.

11. The UE of claim 9, wherein the one or more processors are further configured to:

configure the third set of resources for the CSI report such that the CSI report is received prior to the PSSCH transmission, wherein the first SCI further includes an indication of the third set of resources.

12. The UE of claim 9, wherein the one or more transmission parameters comprise at least one of:

a modulation coding scheme, a transport block size, or a number of multiple-input multiple-output layers.

13. The UE of claim 9, wherein the PSSCH transmission includes a second SCI.

14. The UE of claim 13, wherein the first SCI indicates that the PSSCH transmission includes the second SCI.

15. The UE of claim 13, wherein the first SCI indicates a location in the PSSCH transmission of the second SCI.

16. The UE of claim 13, wherein the second set of resources being scheduled for the sidelink CSI-RS transmission implicitly indicates that the PSSCH transmission includes the second SCI.

17. A non-transitory computer-readable medium storing one or more instructions for wireless communication, the one or more instructions comprising:

one or more instructions that, when executed by one or more processors of a user equipment (UE), cause the one or more processors to:

configure a first set of resources for a physical sidelink shared channel (PSSCH) transmission;

configure a second set of resources for a sidelink channel state information (CSI) reference signal (CSI-RS) transmission, wherein the sidelink CSI-RS transmission is associated with the PSSCH transmission, and the sidelink CSI-RS transmission occurs prior to the PSSCH transmission;

transmit a first sidelink control information (SCI) in a physical sidelink control channel (PSCCH) transmission, the first SCI including an indication of the first set of resources and the second set of resources;

perform the sidelink CSI-RS transmission in the second set of resources;

receive a CSI report in a third set of resources;

configure one or more transmission parameters for the PSSCH transmission based at least in part on the CSI report; and perform the PSSCH transmission based at least in part on the one or more transmission parameters.

18. The non-transitory computer-readable medium of claim 17, wherein the PSSCH transmission is transmitted in the first set of resources.

19. The non-transitory computer-readable medium of claim 17, wherein the one or more instructions, when executed by the one or more processors, further cause the one or more processors to:

configure the third set of resources for the CSI report such that the CSI report is received prior to the PSSCH transmission, wherein the first SCI further includes an indication of the third set of resources.

20. The non-transitory computer-readable medium of claim 17, wherein the one or more transmission parameters comprise at least one of:
   a modulation coding scheme,
   a transport block size, or
   a number of multiple-input multiple-output layers.

21. The non-transitory computer-readable medium of claim 17, wherein the PSSCH transmission includes a second SCI.

22. The non-transitory computer-readable medium of claim 21, wherein the first SCI indicates that the PSSCH transmission includes the second SCI.

23. The non-transitory computer-readable medium of claim 21, wherein the first SCI indicates a location in the PSSCH transmission of the second SCI.

24. The non-transitory computer-readable medium of claim 21, wherein the second set of resources being scheduled for the sidelink CSI-RS transmission implicitly indicates that the PSSCH transmission includes the second SCI.

25. An apparatus for wireless communication, comprising:
   means for configuring a first set of resources for a physical sidelink shared channel (PSSCH) transmission;
   means for configuring a second set of resources for a sidelink channel state information (CSI) reference signal (CSI-RS) transmission, wherein the sidelink CSI-RS transmission is associated with the PSSCH transmission, and the sidelink CSI-RS transmission occurs prior to the PSSCH transmission;
   means for transmitting a first sidelink control information (SCI) in a physical sidelink control channel (PSCCH) transmission, the first SCI including an indication of the first set of resources and the second set of resources;
   means for performing the sidelink CSI-RS transmission in the second set of resources;
   means for receiving a CSI report in a third set of resources;
   means for configuring one or more transmission parameters for the PSSCH transmission based at least in part on the CSI report and
   means for performing the PSSCH transmission based at least in part on the one or more transmission parameters.

26. The apparatus of claim 25, wherein the means for performing the PSSCH transmission comprises:
   means for performing the PSSCH transmission in the first set of resources.

27. The apparatus of claim 25, further comprising:
   means for configuring the third set of resources for the CSI report such that the CSI report is received prior to the PSSCH transmission,
      wherein the first SCI further includes an indication of the third set of resources.

28. The apparatus of claim 25, wherein the one or more transmission parameters comprise at least one of:
   a modulation coding scheme,
   a transport block size, or
   a number of multiple-input multiple-output layers.

29. The apparatus of claim 25, wherein the PSSCH transmission includes a second SCI.

30. The apparatus of claim 29, wherein the first SCI indicates that the PSSCH transmission includes the second SCI.

* * * * *